(12) United States Patent
McFarlin (10) Patent No.: US 11,361,301 B2
(45) Date of Patent: Jun. 14, 2022

(54) SYSTEM AND METHOD FOR SERVICE TRANSACTION

(71) Applicant: Benny T McFarlin, Atlanta, GA (US)

(72) Inventor: Benny T McFarlin, Atlanta, GA (US)

(73) Assignee: GAS VALET INC, Atlanta, GA (US)

( * ) Notice: Subject to any disclaimer, the term of this patent is extended or adjusted under 35 U.S.C. 154(b) by 314 days.

(21) Appl. No.: 16/745,542

(22) Filed: Jan. 17, 2020

(65) Prior Publication Data

US 2021/0224781 A1 Jul. 22, 2021

(51) Int. Cl.
| | |
|---|---|
| *G06Q 20/32* | (2012.01) |
| *G06Q 30/06* | (2012.01) |
| *G06Q 50/06* | (2012.01) |
| *G06Q 20/20* | (2012.01) |
| *G06Q 20/40* | (2012.01) |
| *H04L 9/40* | (2022.01) |
| *G06F 3/0482* | (2013.01) |
| *G06Q 30/02* | (2012.01) |
| *H04L 67/52* | (2022.01) |
| *H04L 67/60* | (2022.01) |

(52) U.S. Cl.
CPC ....... *G06Q 20/3223* (2013.01); *G06F 3/0482* (2013.01); *G06Q 20/209* (2013.01); *G06Q 20/40* (2013.01); *G06Q 30/0282* (2013.01); *G06Q 30/0633* (2013.01); *G06Q 30/0641* (2013.01); *G06Q 50/06* (2013.01); *H04L 63/083* (2013.01); *H04L 67/18* (2013.01); *H04L 67/32* (2013.01)

(58) Field of Classification Search
CPC ....... H04L 67/32; H04L 63/083; H04L 67/18; G06Q 20/3223; G06Q 20/40; G06Q 20/209; G06Q 30/0633; G06Q 30/0641; G06Q 20/18; G06Q 20/145; G06F 3/0482; H04W 12/069; H04W 4/021; H04W 12/63; H04W 4/02; G07F 13/025
USPC .................................................... 705/16, 24
See application file for complete search history.

(56) References Cited

U.S. PATENT DOCUMENTS

2014/0033286 A1* 1/2014 Zhang ............... H04W 12/06 726/7
2015/0339339 A1* 11/2015 Mastrodonato ....... G06F 3/0484 707/805

(Continued)

*Primary Examiner* — Igor N Borissov
(74) *Attorney, Agent, or Firm* — Xu Li (57) ABSTRACT

A method for performing a transaction at an automobile fuel filling facility includes: prompting, on a terminal device, a user to log in to a user account on a transaction platform; displaying, on the terminal device, a list of gas stations; receiving, on the terminal device, a user selection of a gas station from the list of gas stations; displaying, on the terminal device, a list of available attendants at the selected gas station; receiving, on the terminal device, a user selection of an attendant from the list of available attendants; sending, by the terminal device, a service request to the transaction platform, the service request including the selected gas station and the selected attendant; prompting, on the terminal device, the user to enter an authorization code given by the selected attendant at the selected gas station; receiving, on the terminal device, a user input of code; transmitting, by the terminal device, the user input of code to the transaction platform; and after a fuel filling service indicated by the service request has been performed, displaying, on the terminal device, a receipt for the fuel filling service.

20 Claims, 7 Drawing Sheets

(56) References Cited

U.S. PATENT DOCUMENTS

| | | | |
|---|---|---|---|
| 2016/0044174 A1* | 2/2016 | Tuchman | H04M 3/523 |
| | | | 379/265.12 |
| 2018/0053178 A1* | 2/2018 | Shah | G06Q 20/32 |
| 2020/0092689 A1* | 3/2020 | Zhang | H04W 4/20 |

* cited by examiner

SYSTEM AND METHOD FOR SERVICE TRANSACTION

CROSS-REFERENCE TO RELATED APPLICATION

This is a first-filed application.

TECHNICAL FIELD

The present disclosure relates to the field of transaction and authentication technologies. Particularly, the present disclosure relates to transaction and authentication using mobile devices at a gas station.

BACKGROUND

Retails of vehicle fuel is a critical aspect of commerce and modern transportation support. In the United States, there are 168,000 retail locations that sell fuel to the public. Self-service stations are popular in the United States mostly due to cost saving for the consumers. However, drawbacks of self-service stations are becoming notable in recent years. Violent crimes, theft, and credit card slider/skimmer scams at the gas stations have raised significant concerns for customers. Other concerns and inconveniences include debit card holds, sanitary concerns of pathogen contamination at the gas pump, and operation difficulties for certain individuals such as the handicapped the elderlies. Some of above mentioned problems are not fully addressed even at full-service gas stations, where the safety of the costumer and the safety of the attendant, the convenience of the transaction, and the quality of the service cannot be guaranteed.

Therefore, there is continued need for a safe and convenient retail environment and transaction system at gas stations and other service locations.

SUMMARY

In one aspect of the present disclosure, a method for performing a transaction at an automobile fuel filling facility is provided. The method may be applied to a user terminal device. The method includes: prompting, on a terminal device, a user to log in to a user account on a transaction platform; displaying, on the terminal device, a list of gas stations; receiving, on the terminal device, a user selection of a gas station from the list of gas stations; displaying, on the terminal device, a list of available attendants at the selected gas station; receiving, on the terminal device, a user selection of an attendant from the list of available attendants; sending, by the terminal device, a service request to the transaction platform, the service request including the selected gas station and the selected attendant; prompting, on the terminal device, the user to enter an authorization code given by the selected attendant at the selected gas station; receiving, on the terminal device, a user input of code; transmitting, by the terminal device, the user input of code to the transaction platform; and after a fuel filling service indicated by the service request has been performed, displaying, on the terminal device, a receipt for the fuel filling service.

In certain embodiments, the method further includes: displaying, on the terminal device, a list of fuel types; and receiving, on the terminal device, a user selection of a fuel type from the list of gasoline types. The service request further includes the selected fuel type.

In certain embodiments, the method further includes: displaying, on the terminal device, a list of service types; and receiving, on the terminal device, a user selection of a service type from the list of gasoline types. The service request further includes the selected service type.

In certain embodiments, the method further includes: displaying, on the terminal device, a list of payment options; receiving, on the terminal device, a user input of payment option; and sending, by the terminal device, the user input of payment option to the transaction platform.

In certain embodiments, the method further includes: after displaying the receipt for the fuel filling service, prompting, on the terminal device, the user to input a rating or a review; receiving, by the terminal device, a user input of rating or review; and transmitting, by the terminal device, the user input of rating or review to the transaction platform.

In certain embodiments, the method further includes: after displaying the receipt for the fuel filling service, displaying, on the terminal device, an option for the user to enter a tip amount; receiving, by the terminal device, a user input of a tip amount; and transmitting, by the terminal device, the user input of the tip amount to the transaction platform.

In certain embodiments, the method further includes: displaying, on the terminal device, one or more additional purchase options at the selected gas station, the additional purchase options including purchasing additional services or merchandise; and receiving, on the terminal device, a user selection of one or more additional purchases. The service request further includes the user selection of one or more additional purchases.

In certain embodiments, the terminal device is a smart phone or a smart tablet.

In another aspect of the present disclosure, a method for performing a transaction at an automobile fuel filling facility is provided. The method may be applied to a platform server. The method includes: receiving, by a server from a first terminal device, a user to log in to a user account on a transaction platform; receiving, by the server from the first terminal device, a service request, the service request including a selected gas station and a selected attendant; generating, by the server, an authorization code corresponding to the service request; sending, by the server, the authorization code to a second terminal device corresponding to the selected attendant; receiving, by the server from the first terminal device, a code inputted by the user; comparing, by the server, the authorization code with the code inputted by the user; determining, by the server, whether to grant the service request according to at least a comparison result of the authorization code with the inputted by the user; and if the server determines to grant the service request, performing: sending, by the server, an authorization of the service request to the second terminal device; receiving, by the server, a service confirmation and a service amount from the second terminal device; and sending, by the server, a service receipt to the first terminal device.

In certain embodiments, the method further includes: receiving, by the server, a selected fuel type and a selected service type from the first terminal device.

In certain embodiments, the method further includes: receiving, by the server, a payment option from the first terminal device.

In certain embodiments, determining whether to grant the service request further includes determining, by the server, whether to grant the service request according to whether a payment authorization is passed.

In certain embodiments, determining whether to grant the service request further includes: receiving, by the sever, a location of the first terminal device; comparing, by the server, the location of the first terminal device to a location of the selected gas station; and determining whether to grant the service request according to whether the location of the first terminal device is within a preconfigured distance from the location of the selected gas station.

In certain embodiments, the method further includes: after sending the service receipt to the first terminal device, receiving, by the server, a user rating or review from the first terminal device.

In certain embodiments, the method further includes: after sending the service receipt to the first terminal device, receiving, by the server, a user input of tip amount from the first terminal device, and applying, by the server, a tip amount to the transaction.

In another aspect of the present disclosure, a system for performing a transaction is provided. The system includes a first terminal device, a second terminal device, and a server, wherein: the first terminal device is configured to perform: prompting a user to log in to a user account on a transaction platform; receiving user login information and sending the user login information to the server; receiving a user input of a service request, the service request including a selection of an attendant at a service location and a selection of a service or a merchandise; and sending the service request to the server; the server is configured to perform: identifying the second terminal device according to the selection of the attendant at the service location; generating an authorization code corresponding to the service request; sending the authorization code to the second terminal device; receiving a code inputted by the user; comparing the authorization code with the code inputted by the user; determining whether to grant the service request according to at least a comparison result of the authorization code with the inputted by the user; and the second terminal device is configured to perform: receiving the authorization code from the server; receiving an authorization of the service request from the server; and sending a service confirmation and a service amount to the server.

In certain embodiments, the server is further configured to perform: receiving a first location of the first terminal device; comparing the first location of the first terminal device to the service location; and determining whether to grant the service request according to whether the first location is within a preconfigured distance from the service location.

In certain embodiments, the service location is a gas station and the service request includes a selection of a fuel type and a selection of a service type.

In certain embodiments, the first terminal device is a smart phone or a tablet.

In certain embodiments, the second terminal device is a smart phone or a tablet.

The above aspects will be made clear in the drawings and detailed description of the invention.

BRIEF DESCRIPTION OF THE DRAWINGS

In order to more clearly illustrate the technical solutions in the embodiments of the present disclosure, the drawings used in the description of the embodiments will be briefly described below. It is obvious that the drawings in the following description are only some embodiments of the present disclosure. Other drawings may be obtained by those of ordinary skill in the art based on these drawings.

DETAILED DESCRIPTION

The technical solutions according to the embodiments of the present disclosure described in the following with reference to the accompanying drawings. The described embodiments are only part of the embodiments of the present disclosure, but not all the embodiments. All other embodiments obtained by a person of ordinary skill in the art based on the embodiments of the present disclosure without creative efforts are within the scope of the present disclosure.

The present disclosure provides a system that allows the customer to fuel their vehicle while remaining safe and secure in their driver's seat. The system is made possible through a combination of authentication and payment technologies.

According to certain embodiments, a transaction platform is provided to assist transaction at participating full-service gas stations. A customer may download and install a transaction (customer version) mobile app to establish a customer account. When needed, the customer may use the transaction mobile app to find and select a participating gas station and an attendant at that location.

According to certain embodiments, the transaction platform may use multiple strategies to ensure the security and validity of the transaction without needing the customer to step out the vehicle. Once the customer arrives at the gas station, the selected attendant may show the customer an authorization code generated by the transaction server and shown on the attendant's transaction app interface. The authorization code may be unique to each attendant at the station and changes at a predefined interval (e.g. 60 seconds). The customer enters the authorization code in the transaction mobile app to proceed with the transaction of fuel purchase and filling service. The transaction platform performs a few verification steps before authorizing the transaction. It checks the open service request between the customer and selected attendant, the authorization code entered by the customer, the geo locations of the customer, the attendant, and the gas station.

According to certain embodiments, the transaction platform may allow the customer to make payments for the fuel purchases using a prepaid account, a credit card, or a cryptocurrency wallet. The system server may authorize the transaction and create a service order if a pre-paid account or cryptocurrency wallet balance is available, or a credit card transaction is authorized. The attendant may receive the service order in the transaction (attendant version) mobile app and perform the service using a corporate charge card.

According to certain embodiments, when the service is complete, the attendant may enter the amount of fuel (e.g., in dollars) in the transaction (attendant version) mobile app and the customer may receive a receipt in the transaction (customer version) mobile app. The customer may optionally leave a review and/or an additional gratuity (tip) for the attendant.

Figure 1:
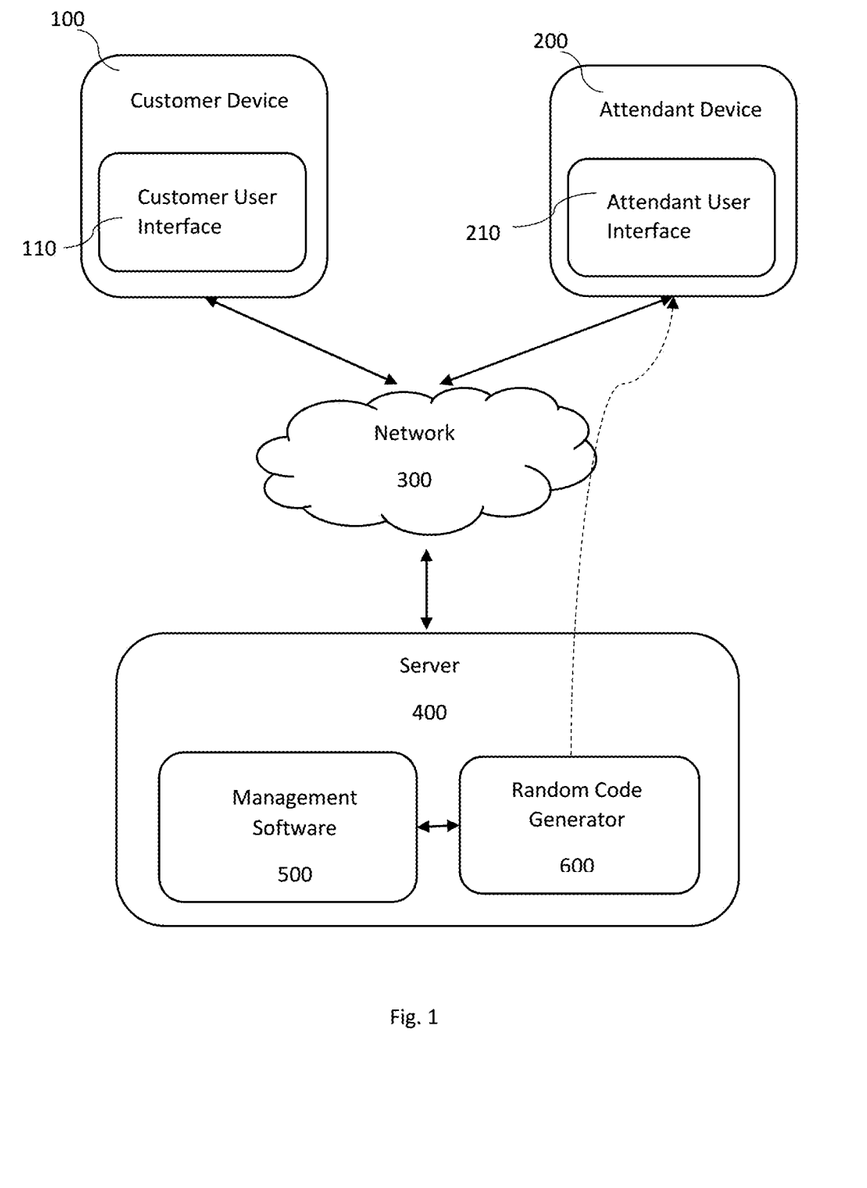
FIG. 1 is a diagram showing the overall system setup of a transaction platform.

FIG. 1 shows an overall system setup of the transaction platform of the present disclosure. A gas station customers may use a customer device 100 to access the transaction platform. The customer device 100 may be a smart phone, a tablet, or other mobile electronic devices. A customer user interface 110 may be installed on the customer device 100. In one embodiment, the customer user interface 110 is a mobile app customized to the customer device 100. The customer user interface 110 allows the customer to access the platform server 400 through a wireless network 300 using the customer device 100. Similarly, the participating gas station attendants use the attendant devices 200 to access the transaction platform. The attendant device 200 also may be a smart phone, a tablet, or other mobile electronic devices. The attendant user interface 210 is installed on the attendant device 200. The platform server 400 runs a code generator 600. The code generator 600 generates an authorization code unique to each attendant that varies at a predefined interval (for example, 60 seconds). The authorization codes are transmitted to the attendant device 200 and may be read by the attendant on the attendant user interface 210. The platform server 400 also runs a management software 500 for the operation of the transaction platform.

Figure 2:
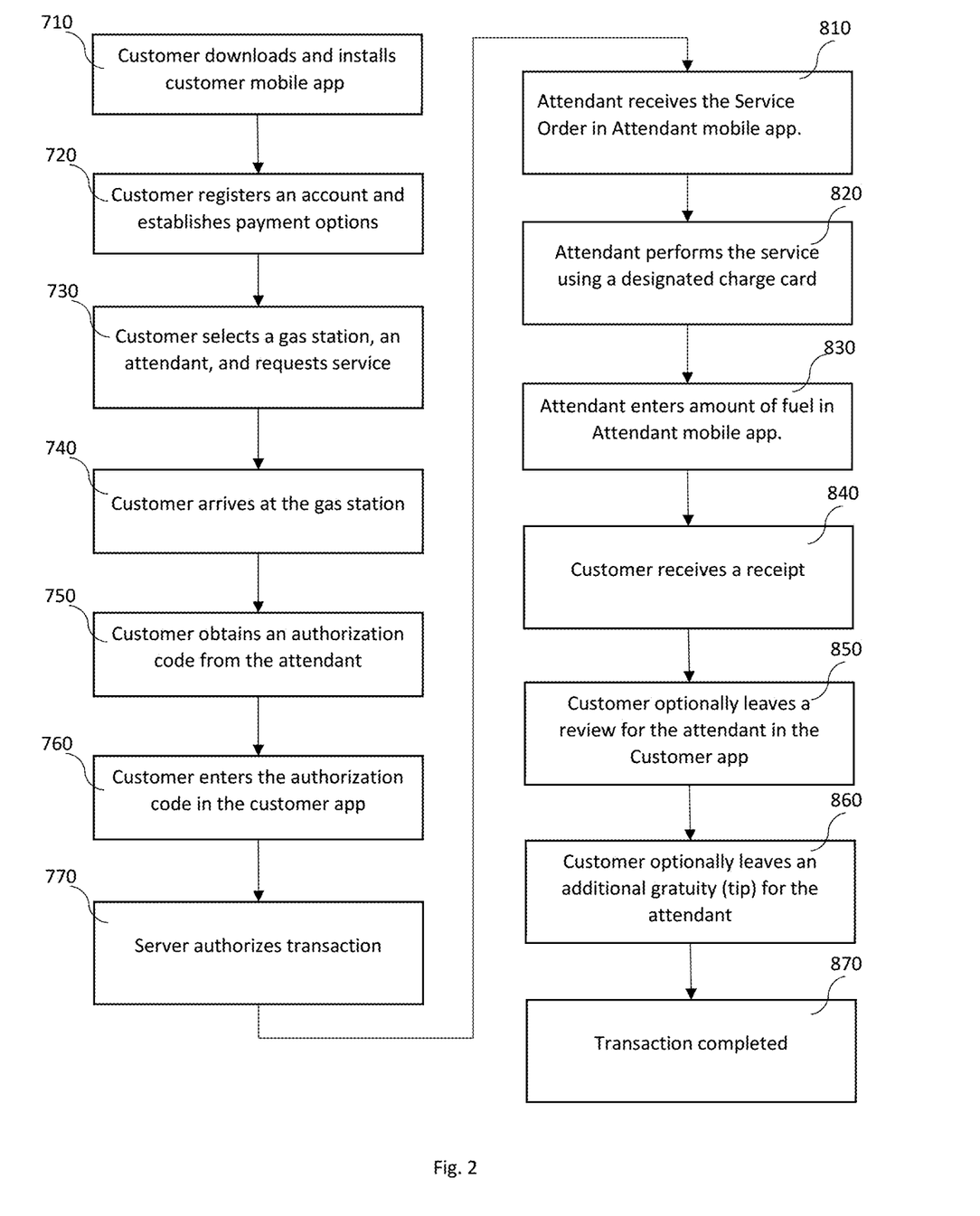
FIG. 2 is a diagram showing the operational process of an embodiment of the transaction platform.

FIG. 2 shows the operational process according to certain embodiment of the transaction platform. First, the customer downloads and installs customer mobile app 110 (step 710) and registers an account and establishes payment options (step 720). Payment options may include pre-paid balance, credit cards, or a cryptocurrency wallet. In some embodiments, the system allows the customer to save credit card information in their account profile. In some embodiments, the system allows the customer to link a cryptocurrency wallet to their account profile. When a need for fuel filling arises, the customer selects a gas station, an attendant, and requests service using the customer mobile app 110 (step 730). This selection process will be described in further details by FIG. 3 and the accompanying description. Next, when the customer arrives at the gas station (step 740), the customer obtains a authorization code from the attendant of choice (step 750). The authorization code is generated by the random code generator 600 on the platform server 500 and is sent to the attendant device 200. The attendant may give this code to the customer by showing the attendant user interface to the customer or by verbally communicating the code to the customer. The customer enters the authorization code in the customer user interface 110 (step 760). The server then performs an authentication process on the transaction (step 770). This process will be further described in FIGS. 4A and 4B and their accompanying written descriptions. After the transaction is authorized, the attendant receives the Service Order in Attendant mobile app (step 810) and performs the fuel filling service (Step 820). The attendant may use a designated charge card, such as a corporate charge card (for example, Premium Unleaded, Fill up) or a traditional credit or debit card. After fuel filling is performed, the attendant enters amount of fuel in attendant user interface (step 830) and the customer receives a receipt (step 840). Customer may optionally leave a review for the attendant with the customer user interface (step 850). The customer may also optionally leave an additional gratuity (tip) for the attendant (step 860). The transaction is then completed. (step 870).

Figure 3:
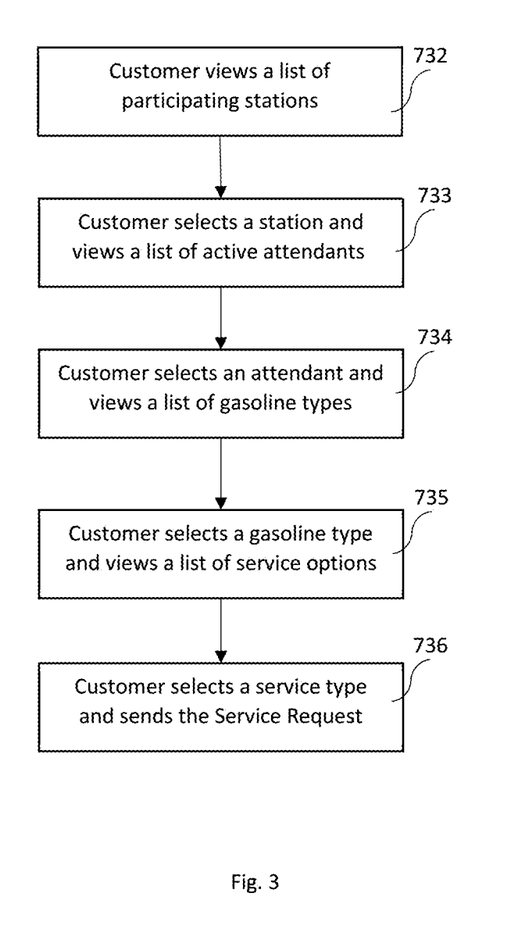
FIG. 3 is a diagram showing the process of selecting a service using the transaction platform.

FIG. 3 shows the process of selecting a service using the transaction platform. Using the customer mobile app 110, the customer may view a list of participating stations (step 732). The customer selects a station and view a list of active attendants (step 733). The customer then selects an attendant and views a list of gasoline types (step 734). Next, the customer selects a gasoline type and views a list of service options (step 735). Finally, the customer selects a service type and sends the service request to the server 400 (step 736).

In certain embodiments, the platform may provide selections of additional services, such as one or more additional purchase options at the selected gas station, the additional purchase options including purchasing additional services or merchandise, such as car washes and snacks. The selection of additional services may be included in the service request.

Figure 4A:
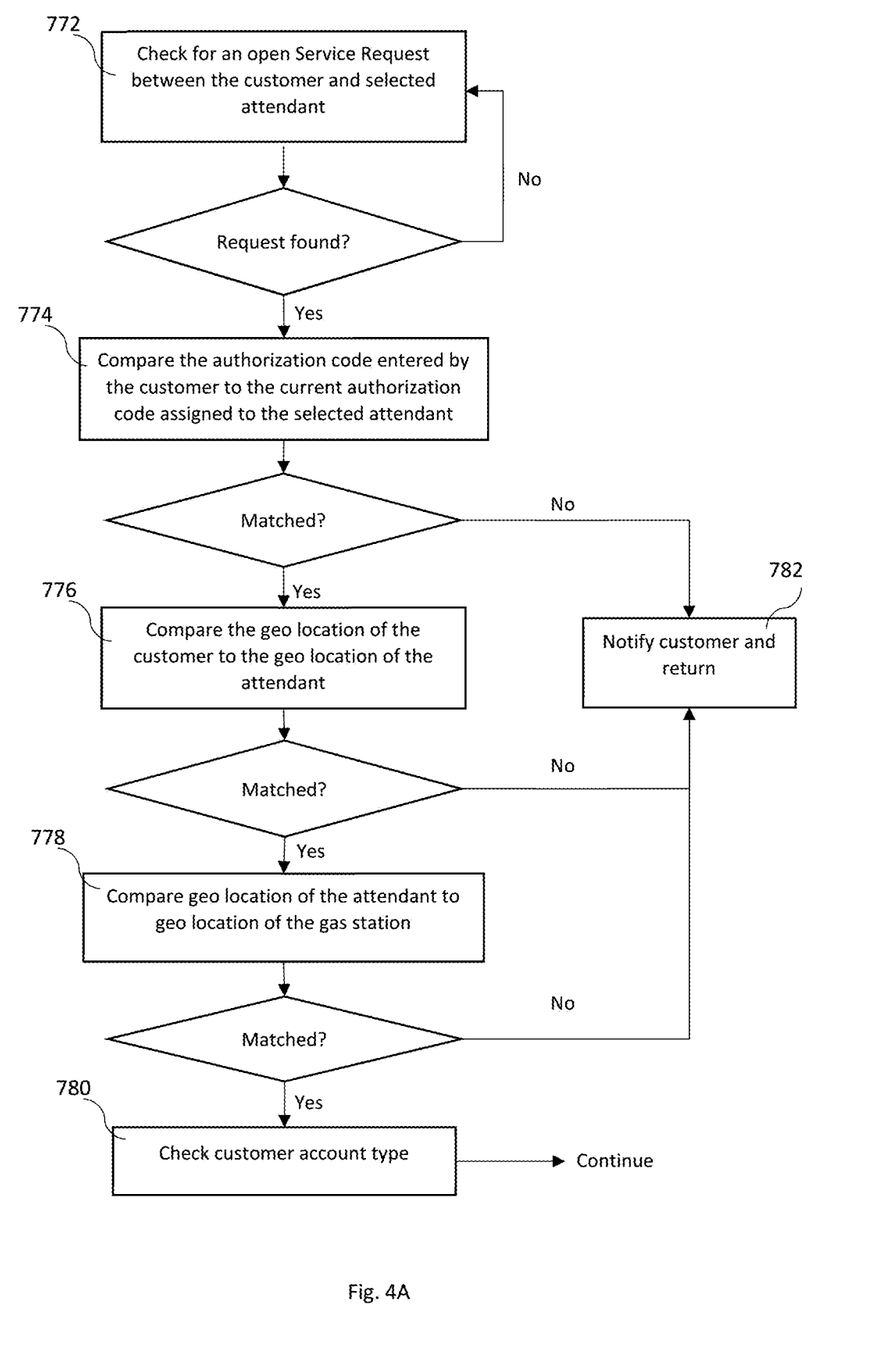
FIG. 4A is a flow chart showing the authentication process for the transaction (Part I).
Figure 4B:
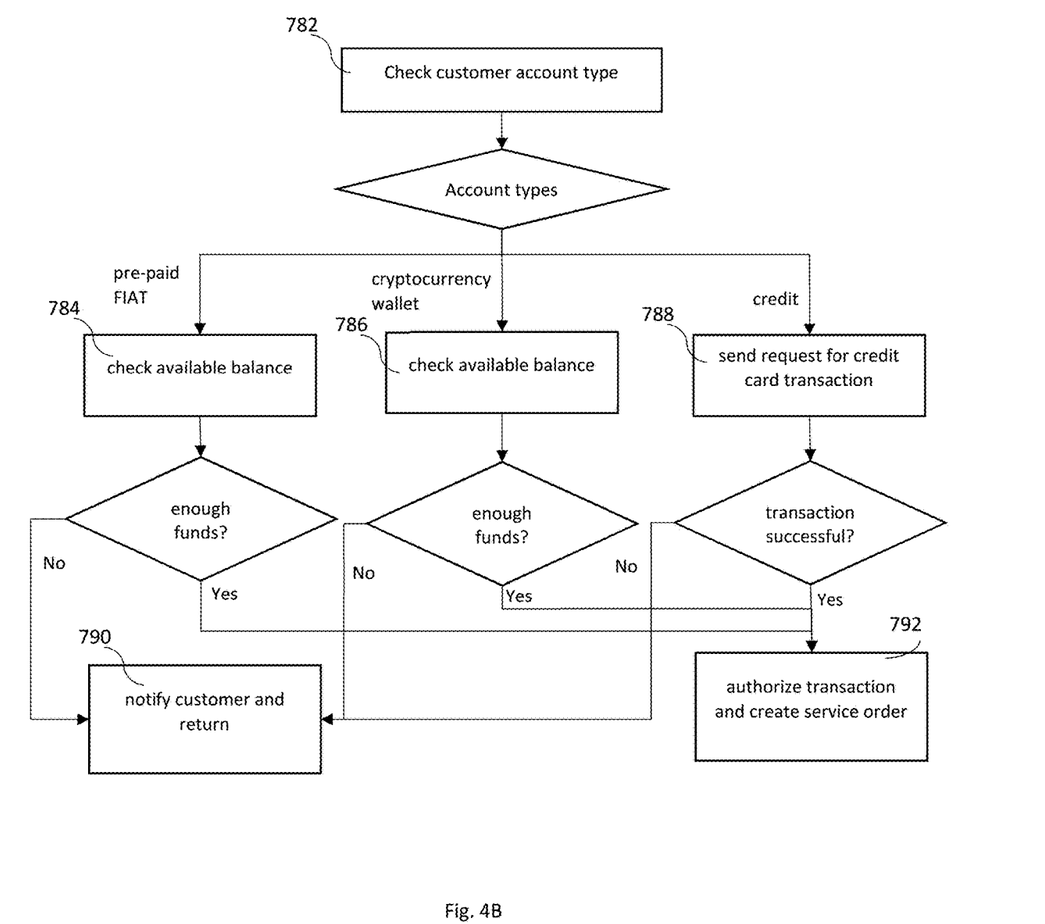
FIG. 4B is a flow chart showing the authentication process for the transaction (Part II).

The flow charts in FIGS. 4A and 4B show the authentication process of the transaction. This authentication process is mainly performed by the platform server 400. First, the system checks for an open Service Request between the customer and selected attendant (step 720). If the request is found, the system compares the authorization code entered by the customer to the current authorization code assigned to the selected attendant (step 774). If the codes do not match, the customer is notified the process terminates (step 782). If the codes match in step 774, the system compares the geo location of the customer to the geo location of the attendant (step 776). If the locations do not match, the customer is notified the process terminates (step 782). If the locations match in step 776, i.e., the customer is within an acceptable range of distance from the attendant (for example, within 1000 ft), the system proceeds to compare geo location of the attendant to geo location of the gas station (step 778). If the locations do not match, the customer is notified the process terminates (step 782). If the locations match in step 778, i.e., the attendant is within an acceptable range of distance from the gas station (for example, within 1000 ft), the system proceeds to check the customer account type (step 780). In some embodiments, if the customer has multiple account types, they may be able to select a preferred account type for this specific transaction.

In step 782, if the account type is determined to be a pre-paid account, the system checks if the available balance has enough funds for the transaction (step 784). If the account type is determined to be a cryptocurrency wallet, the system also checks if the available balance has enough funds for the transaction (step 786). In both steps 784 and 786, if the system determines that enough funds are available in the accounts, it proceeds to authorize the transaction and creates a service order (step 792). If funds are not available or adequate, the customer is notified and the process is terminated (step 790). In step 782, if the account type is determined to be a credit card, the system sends a request for credit card transaction (step 788). If the transaction is successful, the system proceeds to authorize the transaction and creates a service order (step 792). If the transaction is not successful, the customer is notified and the process is terminated (step 790).

Figure 5A:
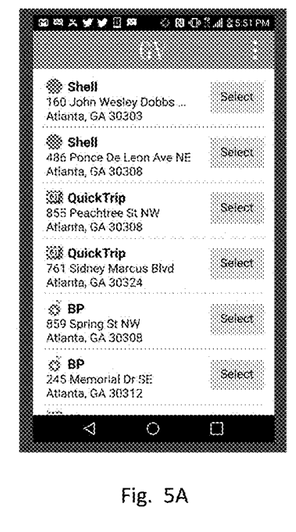
FIG. 5A shows an embodiment of the customer user interface.
Figure 5B:
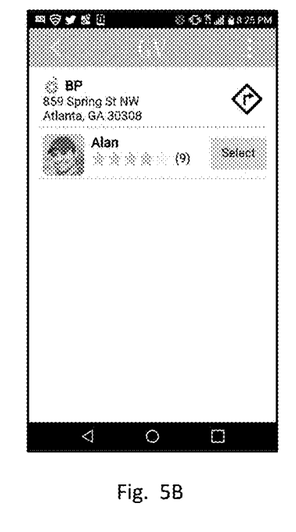
FIG. 5B shows another embodiment of the customer user interface.
Figure 5C:
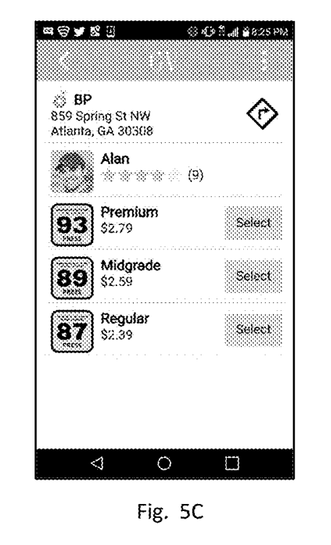
FIG. 5C shows another embodiment of the customer user interface.
Figure 5D:
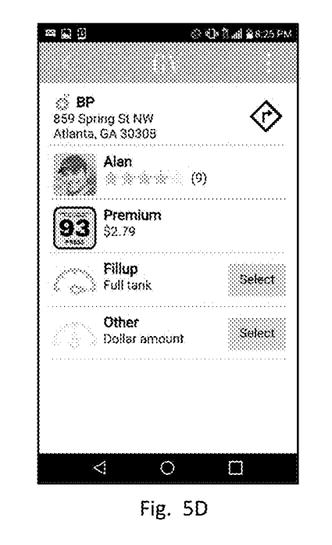
FIG. 5D shows another embodiment of the customer user interface.
Figure 5E:
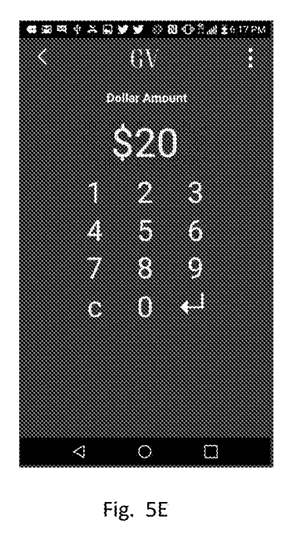
FIG. 5E shows another embodiment of the customer user interface.
Figure 5F:
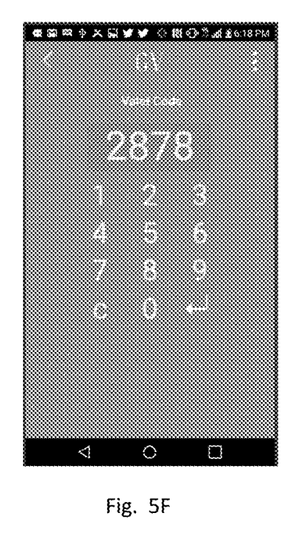
FIG. 5F shows another embodiment of the customer user interface.
Figure 5G:
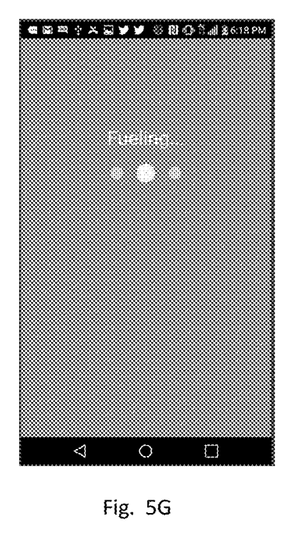
FIG. 5G shows another embodiment of the customer user interface.
Figure 5H:
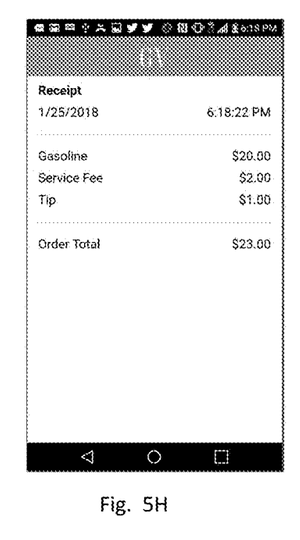
FIG. 5H shows another embodiment of the customer user interface.

FIGS. 5A-5H show some examples of the customer user interface. FIG. 5A is an interface of showing the customer a list of participating stations in step 732. FIG. 5B is an interface showing a list of active attendants once the customer selects a station in step 733. FIG. 5C is an interface showing a list of gasoline types once the customer selects an attendant in step 734. FIG. 5D is an interface showing a list of service options once the customer selects a gasoline type in step 735. FIG. 5E is an interface allowing the customer to enter the dollar amount and send the service request in step 736. FIG. 5F is an interface allowing the customer to enter the authorization code in step 760. FIG. 5G is an interface communicating the status of the transaction to the customer. FIG. 5H is an interface showing the customer the receipt of the transaction in step 840.

In certain embodiments, the forgoing method and system may be applied to service locations other than gas stations, such as grocery and other stores.

The method and apparatus provided by the present disclosure according to the embodiments are described in detail above. The principles and implementation manners provided by the present disclosure are described herein by using specific examples. The description of the above embodiments is only used to help understand the method provided by the present disclosure. At the same time, a person skilled in the art will make changes the specific embodiments and the application scope according to the idea provided by the present disclosure. In summary, the contents of the present specification should not be construed as limiting the present disclosure.

What is claimed is:

1. A method for performing a transaction at an automobile fuel filling facility, including:
    prompting, on a terminal device, a user to log in to a user account on a transaction platform;
    displaying, on the terminal device, a list of gas stations;
    receiving, on the terminal device, a user selection of a gas station from the list of gas stations;
    displaying, on the terminal device, a list of available attendants at the selected gas station;
    receiving, on the terminal device, a user selection of an attendant from the list of available attendants;
    sending, by the terminal device, a service request to the transaction platform, the service request including the selected gas station and the selected attendant;
    prompting, on the terminal device, the user to enter an authorization code given by the selected attendant at the selected gas station;
    receiving, on the terminal device, a user input of code;
    transmitting, by the terminal device, the user input of code to the transaction platform; and
    after a fuel filling service indicated by the service request has been performed, displaying, on the terminal device, a receipt for the fuel filling service.

2. The method according to claim 1, wherein:
    the method further comprises:
        displaying, on the terminal device, a list of fuel types; and
        receiving, on the terminal device, a user selection of a fuel type from the list of gasoline types; and
    the service request further includes the selected fuel type.

3. The method according to claim 1, wherein:
    the method further comprises:
        displaying, on the terminal device, a list of service types; and
        receiving, on the terminal device, a user selection of a service type from the list of gasoline types; and
    the service request further includes the selected service type.

4. The method according to claim 1, further comprising:
    displaying, on the terminal device, a list of payment options;
    receiving, on the terminal device, a user input of payment option; and
    sending, by the terminal device, the user input of payment option to the transaction platform.

5. The method according to claim 1, further comprising:
    after displaying the receipt for the fuel filling service, prompting, on the terminal device, the user to input a rating or a review;
    receiving, by the terminal device, a user input of rating or review; and
    transmitting, by the terminal device, the user input of rating or review to the transaction platform.

6. The method according to claim 1, further comprising:
    after displaying the receipt for the fuel filling service, displaying, on the terminal device, an option for the user to enter a tip amount;
    receiving, by the terminal device, a user input of a tip amount; and
    transmitting, by the terminal device, the user input of the tip amount to the transaction platform.

7. The method according to claim 1, wherein:
    the method further comprises:
        displaying, on the terminal device, one or more additional purchase options at the selected gas station, the additional purchase options including purchasing additional services or merchandise; and
        receiving, on the terminal device, a user selection of one or more additional purchases; and
    the service request further includes the user selection of one or more additional purchases.

8. The method according to claim 1, wherein:
    the terminal device is a smart phone or a smart tablet.

9. A method for performing a transaction at an automobile fuel filling facility, including:
    receiving, by a server from a first terminal device, a user credentials to log in to a user account on a transaction platform;
    receiving, by the server from the first terminal device, a service request, the service request including a selected gas station and a selected attendant;
    generating, by the server, an authorization code corresponding to the service request;
    sending, by the server, the authorization code to a second terminal device corresponding to the selected attendant;
    receiving, by the server from the first terminal device, a code inputted by the user;
    comparing, by the server, the authorization code with the code inputted by the user;
    determining, by the server, whether to grant the service request according to at least a comparison result of the authorization code with the inputted by the user; and
    if the server determines to grant the service request, performing: sending, by the server, an authorization of the service request to the second terminal device;
    receiving, by the server, a service confirmation and a service amount from the second terminal device; and
    sending, by the server, a service receipt to the first terminal device.

10. The method according to claim 9, further comprising:
    receiving, by the server, a selected fuel type and a selected service type from the first terminal device.

11. The method according to claim 9, further comprising:
receiving, by the server, a payment option from the first terminal device.

12. The method according to claim 9, wherein:
determining whether to grant the service request further comprises determining, by the server, whether to grant the service request according to whether a payment authorization is passed.

13. The method according to claim 9, wherein:
determining whether to grant the service request further comprises:
receiving, by the sever, a location of the first terminal device;
comparing, by the server, the location of the first terminal device to a location of the selected gas station; and
determining whether to grant the service request according to whether the location of the first terminal device is within a preconfigured distance from the location of the selected gas station.

14. The method according to claim 9, further comprising:
after sending the service receipt to the first terminal device, receiving, by the server, a user rating or review from the first terminal device.

15. The method according to claim 9, further comprising:
after sending the service receipt to the first terminal device, receiving, by the server, a user input of tip amount from the first terminal device, and applying, by the server, a tip amount to the transaction.

16. A system for performing a transaction, comprising a first terminal device, a second terminal device, and a server, wherein:
the first terminal device is configured to perform:
prompting a user to log in to a user account on a transaction platform;
receiving user login information and sending the user login information to the server;
receiving a user input of a service request, the service request including a selection of an attendant at a service location and a selection of a service or a merchandise; and
sending the service request to the server;
the server is configured to perform:
identifying the second terminal device according to the selection of the attendant at the service location;
generating an authorization code corresponding to the service request;
sending the authorization code to the second terminal device;
receiving a code inputted by the user;
comparing the authorization code with the code inputted by the user;
determining whether to grant the service request according to at least a comparison result of the authorization code with the inputted by the user; and
the second terminal device is configured to perform:
receiving the authorization code from the server;
receiving an authorization of the service request from the server; and
sending a service confirmation and a service amount to the server.

17. The system according to claim 16, wherein the server is further configured to perform:
receiving a first location of the first terminal device;
comparing the first location of the first terminal device to the service location; and
determining whether to grant the service request according to whether the first location is within a preconfigured distance from the service location.

18. The system according to claim 16, wherein the service location is a gas station and the service request includes a selection of a fuel type and a selection of a service type.

19. The system according to claim 16, wherein the first terminal device is a smart phone or a tablet.

20. The system according to claim 16, wherein the second terminal device is a smart phone or a tablet.

* * * * *